United States Patent
Nellen et al.

(10) Patent No.: US 8,474,510 B2
(45) Date of Patent: Jul. 2, 2013

(54) SUNSHADE ASSEMBLY AND OPEN ROOF CONSTRUCTION PROVIDED THEREWITH

(75) Inventors: Marcel Johan Christiaan Nellen, Merselo (NL); Stephan Christiaan Vervoort, Boxmeer (NL); Ruud Geurts, Helden (NL); Peter Christiaan Leonardus Manders, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 133 days.

(21) Appl. No.: 12/973,033

(22) Filed: Dec. 20, 2010

(65) Prior Publication Data

US 2011/0146921 A1      Jun. 23, 2011

(30) Foreign Application Priority Data

Dec. 23, 2009 (EP) .................................. 09180676

(51) Int. Cl.
    *B60J 3/00* (2006.01)
(52) U.S. Cl.
    USPC ................... 160/370.22; 160/273.1; 296/97.8
(58) Field of Classification Search
    USPC .. 160/370.22, 271, 272, 273.1, 269; 296/97.8
    See application file for complete search history.

(56) References Cited

U.S. PATENT DOCUMENTS

| | | | | |
|---|---|---|---|---|
| 1,370,500 A * | 3/1921 | Jones | ........................... | 160/23.1 |
| 1,459,155 A * | 6/1923 | Ioor | ................................ | 160/25 |
| 1,673,326 A * | 6/1928 | Goldsmith | ................. | 160/267.1 |
| 3,017,927 A * | 1/1962 | Demko | .......................... | 160/271 |
| 4,649,981 A | 3/1987 | Bibeau | | |
| 5,117,892 A * | 6/1992 | Murray | ....................... | 160/273.1 |
| 5,934,353 A * | 8/1999 | Buhr | .............................. | 160/269 |
| 6,179,373 B1 * | 1/2001 | Bohm et al. | ................... | 296/214 |
| 6,394,173 B2 * | 5/2002 | Enssle | ......................... | 160/273.1 |
| 6,942,003 B2 * | 9/2005 | Thompson | ................. | 160/268.1 |
| 7,114,766 B2 | 10/2006 | Becher et al. | | |

(Continued)

FOREIGN PATENT DOCUMENTS

| | | |
|---|---|---|
| DE | 10225360 | 10/2003 |
| DE | 102004028882 | 1/2006 |

(Continued)

OTHER PUBLICATIONS

European Search Report of the European Patent Office Patent Office in counterpart foreign application No. 09180676.0 filed Dec. 23, 2009.

(Continued)

*Primary Examiner* — Blair M. Johnson
(74) *Attorney, Agent, or Firm* — Steven M. Koehler; Westman, Champlin & Kelly, P.A.

(57) ABSTRACT

A sunshade assembly includes a sunscreen having opposed longitudinal edges which are provided with guide strips which are substantially rigid in transverse direction. Opposed longitudinal guiderails each include a guide channel section defining a guide channel in which the respective guide strip is accommodated when the sunscreen is moved between open and closed positions. The guide channel of each guide rail is bound on the side facing the opposite guiderail by a guide flange supporting the lower side of the sunscreen. A part of the guide channel supports the guide strip on its side remote from the sunscreen. A biasing member acts between at least one of the guide strips and the corresponding guide channel section to bias the guide strip at least on its edge adjacent the sunscreen in a direction away from the guide flange.

18 Claims, 4 Drawing Sheets

U.S. PATENT DOCUMENTS

| | | |
|---|---|---|
| 7,114,767 B2 | 10/2006 | Grimm et al. |
| 7,793,702 B2 * | 9/2010 | Biewer et al. ............ 160/370.22 |
| 7,971,626 B2 * | 7/2011 | Renz ....................... 160/370.22 |
| 2006/0027347 A1 * | 2/2006 | Boehm et al. .............. 160/273.1 |
| 2007/0175603 A1 * | 8/2007 | Lin ............................ 160/273.1 |
| 2008/0179021 A1 | 7/2008 | Biewer |
| 2009/0145559 A1 * | 6/2009 | Glasl et al. ................ 160/273.1 |
| 2009/0178771 A1 * | 7/2009 | Lin .......................... 160/370.22 |
| 2011/0146921 A1 * | 6/2011 | Nellen et al. .................. 160/315 |
| 2011/0227371 A1 | 9/2011 | Nellen et al. |

FOREIGN PATENT DOCUMENTS

| | | |
|---|---|---|
| DE | 202006015107 | 1/2007 |
| DE | 102006023813 | 11/2007 |
| EP | 1588880 A2 | 10/2005 |
| EP | 1616737 A1 | 1/2006 |
| EP | 1953018 | 8/2008 |
| FR | 1379077 | 11/1964 |
| WO | WO 2006053520 | 5/2006 |
| WO | 2010022769 | 3/2010 |

OTHER PUBLICATIONS

Office Action dated Oct. 10, 2012 for U.S. Appl. No. 13/150,796, filed Jun. 1, 2011.

Official Search Report of the European Patent Office in foreign application No. PCT/EP2008/066650 filed Dec. 2, 2008.

Written Opinion of the European Patent Office in foreign application No. PCT/EP2008/066650 filed Dec. 2, 2008.

* cited by examiner

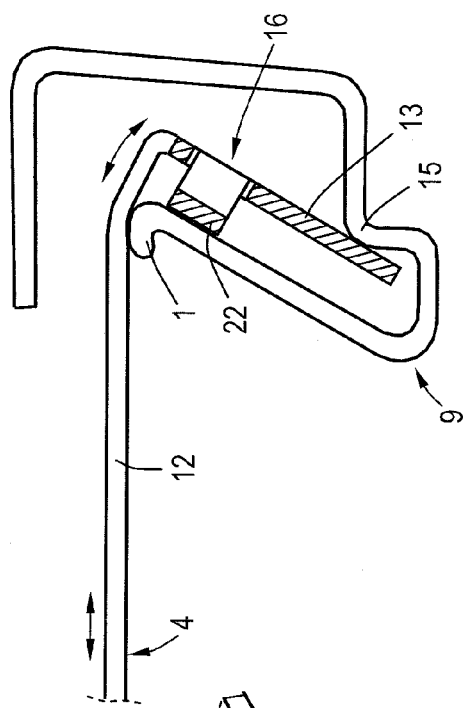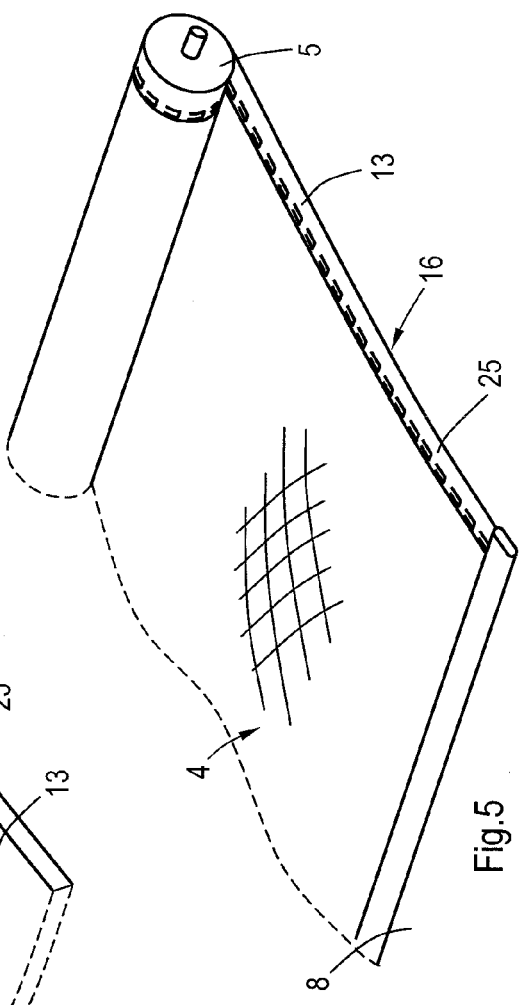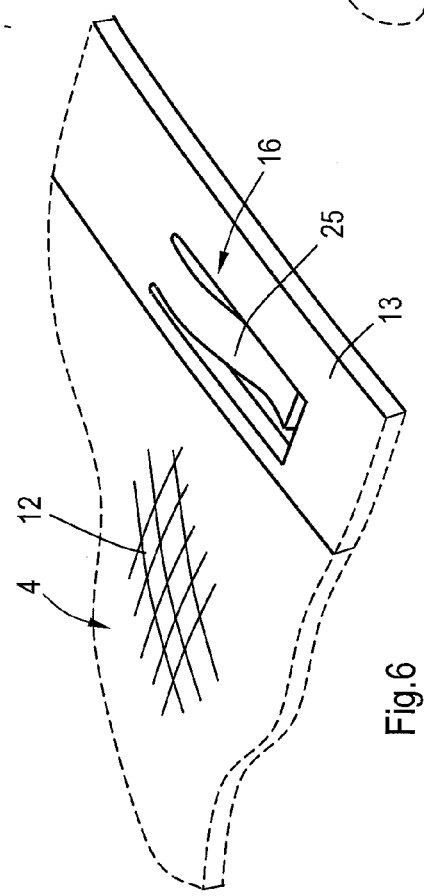

SUNSHADE ASSEMBLY AND OPEN ROOF CONSTRUCTION PROVIDED THEREWITH

BACKGROUND

The discussion below is merely provided for general background information and is not intended to be used as an aid in determining the scope of the claimed subject matter.

Aspects of the present invention relate to a sunshade assembly comprising a sunscreen having upper and lower sides, opposed longitudinal edges, and opposed transversal edges, the longitudinal edges being provided with guide strips which are substantially rigid in transverse direction, and opposed longitudinal guiderails, each including a guide channel section defining a guide channel in which the respective guide strip is accommodated when the sunscreen is moved between open and closed positions, the guide channel of each guide rail being bound on the side facing the opposite guiderail by a guide flange supporting the lower side of the sunscreen, wherein a part of the guide channel supports the guide strip on its side remote from the sunscreen.

In the prior art various arrangements have been proposed to compensate for tolerances in or dimensional variations of sunscreens, in order to keep them taut in transverse direction, which leads to an optimal esthetical presentation of the sunscreen. First of all, it was proposed to make the sunscreen partly or completely from elastic material, so that it has an internal spring function. However, such solution is not possible for heavy fabrics and it is difficult to control the quality. Furthermore it was proposed to allow the guide rails to exert a spring pressure on the sunscreen in laterally outward direction. This leads to a complex arrangement and an even pressure on the sunscreen is difficult to obtain, especially with guide rails curved slightly in longitudinal direction.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention herein described includes a sunshade assembly having a biasing member acting between at least one of the guide strips and the corresponding guide member section to bias the guide strip at least on its edge adjacent the sunscreen in a direction away from the guide flange.

To provide a biasing member acting between the guide strip and the guide channel section, it is not necessary anymore to provide the guide rail or the sunscreen with a spring function.

In one embodiment, the biasing member is located between the guide strip and the guide channel section, and may include at least one separate spring member which is stationary with respect to the guide channel section in longitudinal direction thereof, or the biasing member may be integrated in the guide strip and is then stationary with respect to the guide strip in a longitudinal direction thereof. It is beneficial if the surfaces that are in sliding contact with each other ensure a low frictional resistance so that the force required to move the sunscreen is not increased to much and certainly not to an unacceptable level.

When a biasing member separate from the guide strip is used it may include a spring strip attached to the guide channel section on one longitudinal edge and resting against the guide strip near the other edge, the spring strip being equipped with the spring member.

The spring member may be positioned in different ways with respect to the spring strip and may include one continuous spring or a plurality of springs distributed over the length of the spring strip. In the latter embodiment, the springs can act independently of each other and may therefore easily adapt to the local circumstances, so as to tension the sunscreen evenly, even with local variations. The same is true for the biasing member which is integrated in the guide strip which may have a similar structure as a plurality of springs integrated in the spring strip.

BRIEF DESCRIPTION OF THE DRAWINGS

Aspects of the invention will be further elucidated with referring to the drawing schematically showing embodiments of the invention by way of example.

FIG. 4 is a view corresponding to that of FIG. 2 and showing an third embodiment of the guide strip.

FIG. 5 is a perspective partial view of the sunshade of FIG. 4 on a smaller scale.

FIG. 6 shows detail VI in FIG. 5 on a larger scale.

DETAILED DESCRIPTION OF THE ILLUSTRATIVE EMBODIMENTS

Figure 1:
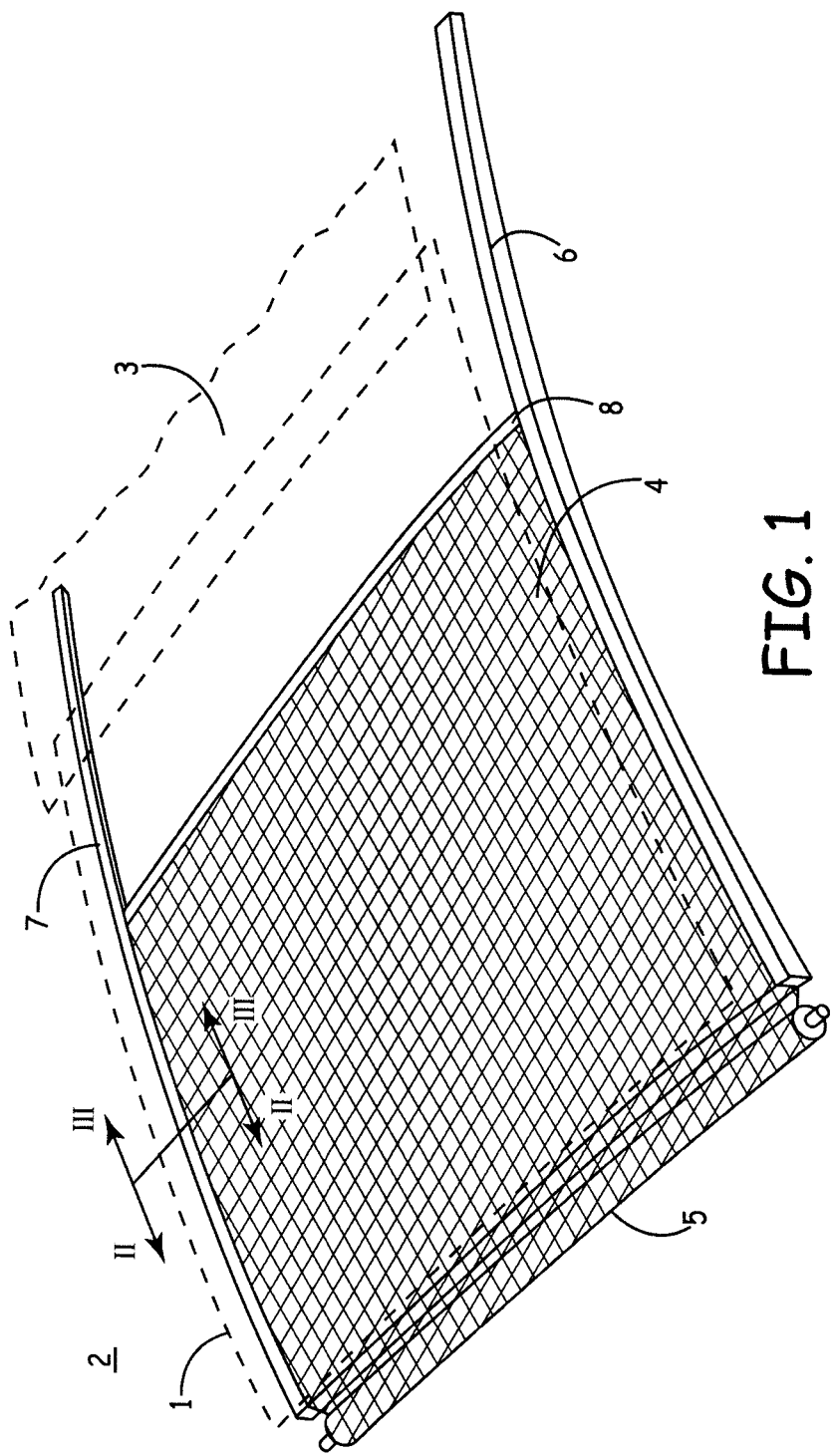
FIG. 1 shows, schematically and in a perspective view, a sunshade assembly applied to an open roof construction.

Firstly referring to FIG. 1, an open roof construction for a vehicle is illustrated schematically in dotted lines. Said open roof construction comprises a roof opening 1 in a stationary roof part 2 of the vehicle, such as a passenger car, and a roof assembly for the roof opening having movable closure panel 3 which, by means not illustrated in detail but known per se, can be moved for opening and closing said roof opening 1. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4, and two opposite guiderails 6 and 7 for cooperation with two opposite longitudinal edges of the sunscreen 4. The sunshade assembly may also be constructed such that the sunscreen is folded when opened.

In so far the sunshade assembly has a conventional shape. Further, in a way known per se, the end of the sunscreen 4 opposite the end which is wound onto the winding shaft 5 is provided with an operating beam 8 which may be gripped manually for operating the sunscreen 4 and locating it in a desired position. The opposite ends of the operating beam 8 are guided in guides not illustrated here (extending along with or integrated into the guiderails 6, 7). The sunscreen may of course also be driven by an electric motor or other driving devices.

Now reference is made to FIGS. 2-6. FIG. 3a/b shows a cross section of one transverse edge of the sunscreen 4 and of the guide rail 7. The same cross section (in mirror image) may be present at the guiderail on the opposite side of the sunscreen. The guide rail 7, which may be slightly curved along its length, comprises a guide channel section 9 for cooperation with the sunscreen 4 and forming a guide channel for it, a main section 10 which may include the operation mechanism for the closure panel and a connecting section 11 interconnecting the main section 10 and the guide channel section 9.

There is shown a side portion 12 of the sunscreen 4 which might be elastically stretchable at least in transverse direction (the remainder of the sunscreen 4 may be substantially inelastic). This portion 12 may be made from stretch textile such as fabric which is treated so as to obtain a low frictional resistance when sliding along the guide rail 6 or 7. It may also be made from other materials such as plastic or a rubber like material, or may be constructed as or provided with an elastic connection. Alternatively, the whole sunscreen 4 may be made from stretch material or may have an elastic structure. However, due to the invention it is not required to use an elastic sunscreen, so that it may also be made completely from substantially non-stretchable or inelastic material.

Attached to the lateral outer end of each side portion 12 of the sunscreen 4 is a guide strip 13, which is thus provided on each longitudinal edge of the sunscreen 4. This guide strip 13, which is straight in cross section in this embodiment, is accommodated in the guide channel section 9 of the guide rails 6, 7. The guide strip 13 is sufficiently flexible so as to be wound on the winding shaft 5 together with the sunscreen.

Figure 2A:
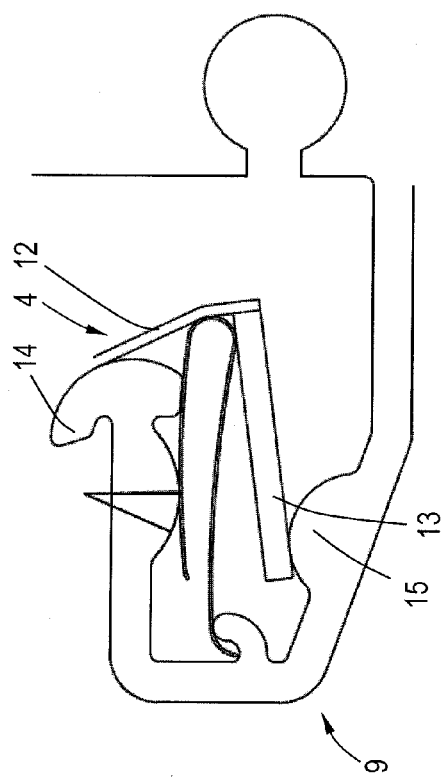
FIGS. 2a and b are schematic transverse cross sections according to the lines II-II in FIG. 1, only showing a guide channel section and the guide strip of the sunscreen with biasing member in two different positions.
Figure 2B:
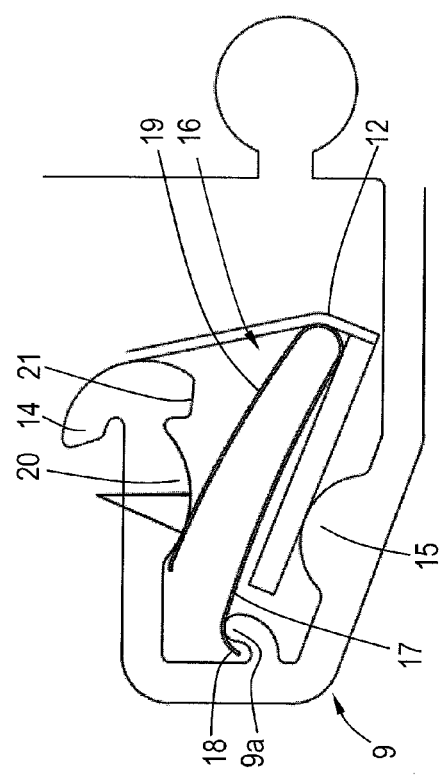

In the first embodiment according to FIGS. 2a, b the guide channel section 9 is shaped such that the guide strip 13 is guided in the guide channel section 9 with such orientation that it makes an acute angle with the main portion of the sunscreen 4 in transverse direction and is able to pivot or rock around a position substantially parallel to the sunscreen 4. The sunscreen 4 is guided around a guide flange 14 at the upper end of the guide channel and being a part of the guide channel section 9. The guide flange 14 is rounded at its free end guiding the sunscreen 4. In this embodiment, the sunscreen 4 is guided downwardly from the guide flange 14 and the guide strip 13 runs from the sunscreen 4 in a direction towards the other guide rail, substantially below the guide flange 14. The guide strip 13 rests against a lower portion 9a of the guide channel section 9, and in particular against a rounded protrusion 15 of the lower portion 9a of the guide channel section 9. The guide strip 13 rests against the protrusion 15 at a position between its ends, wherein the position changes during the rocking or pivoting movement of the guide strip 13 on the protrusion 15.

The guide strip 13 is biased downwardly so as to stretch the sunscreen 4 in a transverse direction by a biasing member 16. Here, the biasing member 16 is made separate from the guide strip 13 and is stationary with respect to the guide channel section 9, at least in longitudinal direction thereof. The length of the biasing member 16 is such that the sunscreen 4, or the operating beam thereof remains in contact with the biasing member 16, so that it is easy to move the sunscreen 4 alongside the biasing member 16 in every position of the sunscreen 4. Preferably, the biasing member 16 is made such that its biasing can vary along the length of the sunscreen 4, so that the position of the guide strip 13 can vary along the length if desired by the properties of the sunscreen 4 or guide channel section 9, in order to ensure a taut and smooth sunscreen 4 in every position thereof.

In the embodiment of FIG. 2a, b the biasing member 16 includes a spring strip 17 hooked or attached on one longitudinal edge to the guide channel section 9, here to a hook 18 thereof, and resting with its other longitudinal edge against the guide strip 13 at a position near the longitudinal edge where the guide strip 13 is attached to the sunscreen 4. A spring 19 is integrated with the guide strip 13 and is formed to the edge of the spring strip where it is resting against the guide strip 13 so as to form a U- or V-shaped biasing member 16. The spring 19 is resting at a distance from or near its free edge against a rounded protrusion 20 on the lower side of the guide flange to rock or pivot around the protrusion in the same way as the guide strip 13 does with respect to protrusion 15. The spring 19 can extend continuously along the same length as the spring strip 17, but may also be interrupted to form a plurality of separate strips in order to influence the spring characteristics and the stiffness of the biasing member against torsion and bending. In this embodiment the guide strip 13 may for example be made from plastic, whereas the spring strip 13 is made from spring steel. The surfaces of the guide strip 13 and/or the spring strip 17 that slide along each other may be treated so as to ensure low friction sliding properties.

The free edge of the guide flange 14 has a stop 21 on its lower side forming an abutment for the biasing member 16, in this case the spring 19 thereof, to determine the maximum inwardly pivoted position thereof. In FIGS. 2a, b it is shown that the biasing member 16 is in contact with the sunscreen 4, and although this is not necessary, it assists in keeping the hooked edge of the spring strip 17 in engagement with the hook 18 of the guide channel section 9. The biasing member 16 biases the guide strip 13 in a direction away from the guide flange so as to keep the sunscreen 4 stretched at all times.

Figure 3A:
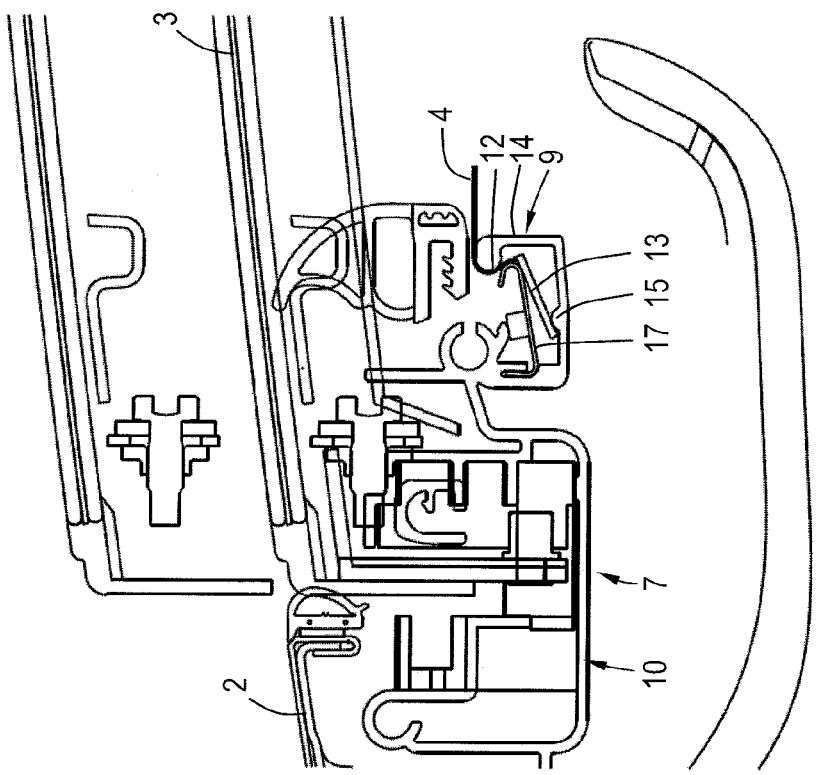
FIGS. 3a, b are transverse cross sections according to the lines III-III in FIG. 1 showing a guide rail and surrounding parts, as well as a second embodiment of the biasing member in two different positions.
Figure 3B:
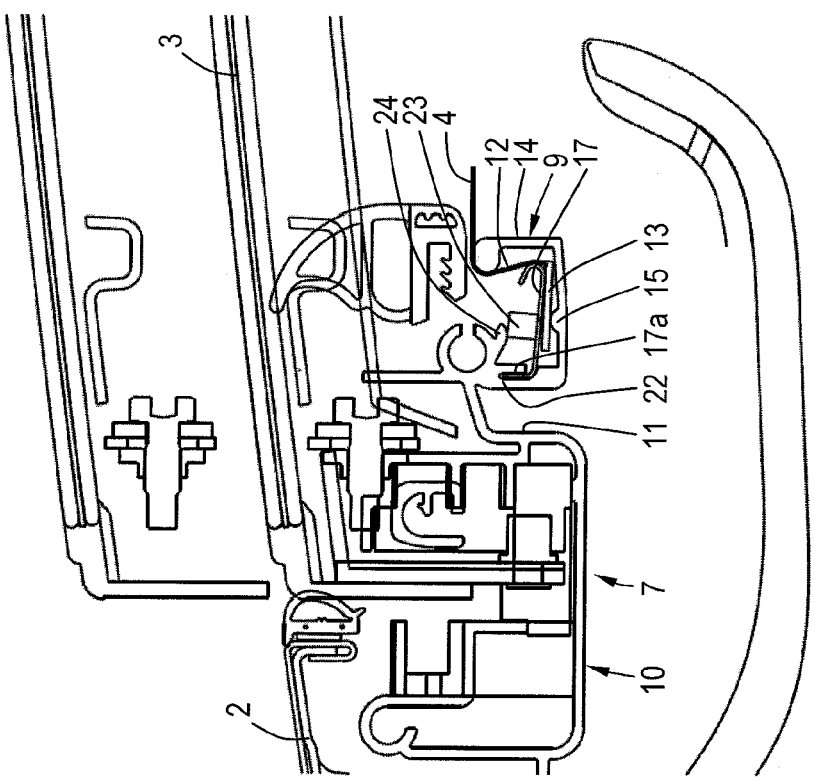

In the embodiment of FIGS. 3a, b the guide channel section 9 is formed differently. The guide flange 14 is shorter such that the guide strip 13 can extend from the sunscreen 4 in a direction away from the opposite guide rail 7. The guide strip 13 rests with its lower side on the protrusion 15 on the lower channel portion 9a and is able to pivot or rock on this protrusion 15 between the positions shown in FIGS. 3a and b, i.e. around a position substantially parallel to the sunscreen 4.

The spring strip 17 in this embodiment is hooked with one edge portion 17a into a groove 22 in the guide channel section 9 to fix the spring strip 17 thereto. As this edge portion 17a remains in the same position when the guide strip 17 changes position, the spring strip 17 then bends and this can provide the necessary spring action if the spring strip 17 is made from elastic material, such as spring steel. Nonetheless, FIGS. 3a, b show an additional spring member 23 consisting of a plurality of springs bent out of the spring strip 17 and co-operating with a stop portion 24 of the guide channel section 9. The spring member 23 is here positioned between the edges of the spring strip 17. The operation of this embodiment is similar to that of FIGS. 2a, b.

FIGS. 4-6 show a third embodiment of the guide strip/biasing member. In this embodiment, the biasing member 16 is integrated in the guide strip 13 and includes a plurality of springs 25 distributed over the length of the guide strip 13 and bent out of it, which can be same as with the springs in the spring strip 17 of the second embodiment. FIG. 6 shows that a leaf spring 25 is bent out of the guide strip 13, with the free end of the spring at a distance from the guide strip 13 in an unbiased condition. FIG. 5 shows that a plurality of springs 25 is distributed along the length of the guide strip 13 and that the guide strip 13 with the springs 25 is flexible enough to be wound on the winding shaft 5. If the guide strip 13 and springs 25 are integrally made of spring steel, the springs may be provided with incisions to influence the spring characteristics to obtain the desired tension on the sunscreen 4 and to enable easy winding of the sunscreen 4 and guide strip 13. The sliding surfaces of the guide strip 13 and springs 25 may be treated or coated to obtain the desired sliding properties with respect to the guide rail which may be made from metal, such as aluminium, plastic or the like.

FIG. 4 shows that one of the springs 25 is in engagement with the guide flange 14, which in this case is in an inclined position, while the guide strip 13 is in an inclined position as well, extending from the side portion 12 of the sunscreen 4 downwardly and in a direction towards the opposite guide rail 7. The spring 25 biases the edge of the guide strip connected to the sunscreen away from the guide flange 14. The guide strip 13 is resting with its side facing away from the sunscreen 4 on the protrusion 15, here formed as a corner of the guide channel section 9, and is able to pivot or rock with respect to this protrusion 15.

As the biasing member 16 includes a plurality of independent springs 25, it is easy to have this biasing member cause different positions of the guide strip 13 locally.

It will be clear from the foregoing description that the invention provides a sunshade assembly and open roof construction and roof assembly comprising such sunshade assembly, which ensures a proper tension of the sunscreen in a reliable and simple manner.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims. For example, the biasing member can be provided in one or in both guide rails. Although it is shown that the guide strip rests against the guide channel section at a distance from the position where the sunscreen is attached to the guide strip so as to be able to pivot with respect to the guide channel section to tension the sunscreen, the guide strip may also move differently, for example slide or make a combined pivoting and sliding movement.

What is claimed is:

1. A sunshade assembly comprising:
  a sunscreen having upper and lower sides, opposed longitudinal edges, and opposed transversal edges, the longitudinal edges being provided with guide strips both having a first edge and a second edge wherein the longitudinal edges of the sunscreen are attached to the guide strips proximate the first edges thereof, wherein the guide strips are substantially rigid in transversal direction,
  opposed and stationary longitudinal guiderails, each including a stationary guide channel section defining a stationary guide channel in which the respective guide strip is accommodated when the sunscreen is moved between open and closed positions, the stationary guide channel of each guiderail being bound on the side facing the opposite guiderail by a stationary guide flange supporting the lower side of the sunscreen, wherein a part of the stationary guide channel supports the guide strip proximate the second end, and
  a biasing member directly contacting and acting between at least one of the guide strips proximate the first edge and the corresponding stationary guide channel section to bias the guide strip at least proximate the first edge and the longitudinal edge of the sunscreen in a direction away from the stationary guide flange.

2. The sunshade assembly of claim 1, wherein the biasing member is located between the guide strip and the guide channel section.

3. The sunshade assembly of claim 2, wherein the biasing member includes at least one separate spring member.

4. The sunshade assembly of claim 3, wherein the biasing member includes a spring strip attached to the guide channel section on one longitudinal edge and resting against the guide strip near the other edge, the spring strip being equipped with a spring forming the spring member.

5. The sunshade assembly of claim 4, wherein the spring is formed at the edge of the spring strip resting against the guide strip, so as to form a substantially U-shaped biasing member.

6. The sunshade assembly of claim 5, wherein the spring of the biasing member is resting against a protrusion on the guide flange at a distance from the free end of the spring.

7. The sunshade assembly of any of claim 4, wherein the spring strip is fixed in or hooked behind a part of the guide channel section.

8. The sunshade assembly of claim 4, wherein the spring member is formed between the ends of the spring strip.

9. The sunshade assembly of claim 1, wherein the biasing member is integrated in the guide strip.

10. The sunshade assembly of claim 9, and further comprising a winding shaft coupled to the sunscreen so as to be wound on the winding roll, and wherein the integrated biasing member is flexible such that the guide strip together with the biasing member is rolled up on the winding shaft.

11. The sunshade assembly of claim 9, wherein the biasing member comprises a plurality of springs distributed over the length of the guide strip.

12. The sunshade assembly of claim 11, wherein each spring is a leaf spring.

13. The sunshade assembly of claim 12, wherein each leaf spring extends substantially in longitudinal direction of the guide strip, one end being fixed to the guide strip and the other end being a free end positioned at a distance from the guide strip in a unbiased condition.

14. The sunshade assembly of claim 9, wherein the guide strip and springs are made from spring steel.

15. The sunshade assembly of claim 1, wherein the guide strip rests against the guide channel section at a distance from the position where the sunscreen is attached to the guide strip so as to be able to pivot with respect to the guide channel section to tension the sunscreen, and the guide strip rests against a rounded protrusion of the guide channel section at a position between its longitudinal edges and is allowed to rock around this rounded protrusion.

16. The sunshade assembly of claim 3, wherein the spring member is stationary with respect to the guide channel section in longitudinal direction thereof.

17. The sunshade assembly of claim 5, wherein the spring rests against the guide flange and extends substantially the full length of the spring strip.

18. The sunshade assembly of claim 8, wherein the spring member includes a plurality of springs distributed over the length of the spring strip.

* * * * *